US010896608B2

(12) United States Patent
Homutescu

(10) Patent No.: US 10,896,608 B2
(45) Date of Patent: Jan. 19, 2021

(54) SYSTEM AND METHOD FOR VEHICLE PARKING ASSISTANCE

(71) Applicant: Continental Automotive GmbH, Hannover (DE)

(72) Inventor: Adrian Homutescu, Iasi (RO)

(73) Assignee: CONTINENTAL AUTOMOTIVE ROMANIA SRL, Timisoara (RO)

( * ) Notice: Subject to any disclaimer, the term of this patent is extended or adjusted under 35 U.S.C. 154(b) by 0 days.

(21) Appl. No.: 16/461,262

(22) PCT Filed: Nov. 20, 2017

(86) PCT No.: PCT/EP2017/079762
§ 371 (c)(1),
(2) Date: May 15, 2019

(87) PCT Pub. No.: WO2018/095859
PCT Pub. Date: May 31, 2018

(65) Prior Publication Data
US 2019/0272753 A1 Sep. 5, 2019

(30) Foreign Application Priority Data
Nov. 22, 2016 (EP) .................................. 16465556

(51) Int. Cl.
*G08G 1/14* (2006.01)
*G01C 21/36* (2006.01)
(Continued)

(52) U.S. Cl.
CPC ......... *G08G 1/141* (2013.01); *G01C 21/3685* (2013.01); *G01K 1/026* (2013.01);
(Continued)

(58) Field of Classification Search
CPC ........ G08G 1/141; G08G 1/147; G08G 1/146; G08G 1/143; G01C 21/3685; G01K 1/026; G01P 5/00; G01W 1/10
(Continued)

(56) References Cited

U.S. PATENT DOCUMENTS

2009/0249878 A1\* 10/2009 Faber .................. G01S 7/52006
73/627
2015/0360720 A1 12/2015 Li et al. ........................ 701/400
(Continued)

FOREIGN PATENT DOCUMENTS

DE  10 2009 027 543 A1   1/2011   ............. G01C 21/34
WO     2018/095859 A1   5/2018   ............. G01C 21/34

OTHER PUBLICATIONS

Extended European Search Report, Application No. 16465556.5, 8 pages, dated Mar. 29, 2017.
(Continued)

*Primary Examiner* — Daryl C Pope
(74) *Attorney, Agent, or Firm* — Slayden Grubert Beard PLLC

(57) ABSTRACT

Various embodiments include a vehicle parking assistance system comprising: a memory storing measured thermal values associated with respective parking spots in a database; and a processor for receiving measured thermal values and availability and/or attractiveness data associated with the respective parking spots from the memory. The processor determines target parking spots for an arriving vehicle based at least in part on the availability and/or attractiveness data and thermal values.

16 Claims, 3 Drawing Sheets

(51) Int. Cl.
  *G01K 1/02* (2006.01)
  *G01P 5/00* (2006.01)
  *G01W 1/10* (2006.01)
(52) U.S. Cl.
  CPC .............. *G01P 5/00* (2013.01); *G01W 1/10* (2013.01); *G08G 1/143* (2013.01); *G08G 1/146* (2013.01); *G08G 1/147* (2013.01)
(58) Field of Classification Search
  USPC .......... 340/901–905, 932.2, 933, 937, 425.5
  See application file for complete search history.

(56) References Cited

U.S. PATENT DOCUMENTS

| | | | |
|---|---|---|---|
| 2015/0369613 A1* | 12/2015 | Stadler | G01C 21/32 701/537 |
| 2016/0238397 A1 | 8/2016 | Caira et al. | 701/400 |
| 2019/0122554 A1* | 4/2019 | Saadeldin | G06Q 10/02 |
| 2019/0259277 A1* | 8/2019 | Dudar | G08G 1/141 |

OTHER PUBLICATIONS

International Search Report and Written Opinion, Application No. PCT/EP2017/079762, 11 pages dated Dec. 22, 2017.

* cited by examiner

SYSTEM AND METHOD FOR VEHICLE PARKING ASSISTANCE

CROSS-REFERENCE TO RELATED APPLICATIONS

This application is a U.S. National Stage Application of International Application No. PCT/EP2017/079762 filed Nov. 20, 2017, which designates the United States of America, and claims priority to EP Application No. 16465556.5 filed Nov. 22, 2016, the contents of which are hereby incorporated by reference in their entirety.

TECHNICAL FIELD

The present disclosure relates to automotive. Various embodiments may include systems and/or methods for vehicle parking assistance.

BACKGROUND

In various situations, vehicle drivers look for parking spots. Parking spots are available in cities along roads and in clusters around commercial centers and malls as well as next to museums and other points of interest. The movement of cars while their drivers are looking for available parking spots creates considerable traffic that could be avoided. Therefore, several systems and methods for managing and organizing parking areas comprising a number of parking spots have been proposed.

For example, the German patent application DE 10 2009 027 543 A1 describes a method wherein the driving route of a car on its way to the next available parking spot is created in a navigation system. The method involves providing a computation algorithm that allows finding a shaded parking spot in order to save air conditioning time and energy expended in a heated car after the parking period when the car leaves the parking spot. The method used a database that comprises data about the shadows shading individual parking spots as well as the positions of buildings.

SUMMARY

The teachings of the present disclosure describe systems and/or methods addressing the problem of finding an optimized solution for managing parking spots in parking areas and that allows taking current conditions/parameters into account. For example, some embodiments include a vehicle parking assistance system (42) comprising: means for receiving measured thermal values that are linked to parking spots (23, 24, 25, 26); means for receiving availability data and/or attractiveness data that are linked to one or more parking spots; means for storing measured thermal values that are linked to individual parking spots; and means for determining target parking spots for one or more arriving cars (20, 21, 22) on the basis of availability and/or attractiveness data and thermal values.

In some embodiments, there are: a first operating unit (1) comprising means for receiving measured thermal values and availability and/or attractiveness data that are linked to one or more parking spots (23, 24, 25, 26); a second operating unit (2) that is able to store measured thermal values that are linked to parking spots in a database (14); and a third operating unit (3) comprising means to determine target parking spots (26) for one or more arriving vehicles (20, 21, 22) on the basis of availability and/or attractiveness data and thermal values.

In some embodiments, thermal values that are receivable by the first operating unit (1) comprise one or more of the group of: temperatures measured at or on parking spots (23, 24, 25, 26) outside of cars, temperatures measured at parking spots inside a car, radiation intensity the parking spot or a car on the parking spot is exposed to, wherein the radiation is originating from the sun, radiation intensity to which the parking spot or a car on the parking spot is exposed, wherein the radiation is originating from other sources (38) than the sun, air temperature, surface temperature of the floor of the parking spot, heat capacity and/or heat conductivity of the material of which the floor of the parking spot consists, local wind velocity, local direction of wind, air humidity, information about cars occupying neigbouring parking spots, information about buildings (35) in the neighborhood of the parking spot, information about heat sources and/or heat sinks (39) in or near the parking area, weather forecasts concerning temperature, weather forecasts concerning solar irradiation, and/or weather forecasts concerning wind velocity and/or direction.

In some embodiments, the availability and/or attractiveness data comprise one or more of the group of: information if the parking spot is occupied, information about thermal properties of the arriving car, information about the size and/or appropriateness of the parking spot (23, 24, 25, 26) for the individual car (20, 21, 22), information about the fuel consumption of the car, information about the generation of environmentally detrimental substances by the car, driving distance of the parking spot from an entrance of the parking area by which the arriving car enters the parking area, and walking distance of the parking spot from a known individual goal (27, 29, 31) of the driver or from a potential point of interest for passengers/drivers.

In some embodiments, the third operating unit (3) in order to determine target parking spots (26) for arriving vehicles uses continuously or periodically measured and transferred thermal values and/or thermal values that are stored in the database (14) and/or thermal values that have been predicted on the basis of thermal values that are stored in the database.

In some embodiments, availability and/or attractiveness data of a parking spot (23, 24, 25, 26) for one arriving car (20, 21, 22) are determined on the basis of a comparison of availability and/or attractiveness data of several available parking spots for more than one arriving car.

In some embodiments, the system (42) comprises means (45) for receiving and/or determining an expected or estimated period of parking time and for taking it into consideration when selecting a parking spot (26).

In some embodiments, the system comprises a fourth operating unit (44) that classifies the parking spots (23, 24, 25, 26) of a parking area according to the level of information that is available in the database (14) about each individual parking spot, wherein, if two parking spots with different levels of information in the database are available, the fourth operating unit proposes to a car the parking spot for which a lower level of information is available.

In some embodiments, the parameter that is optimized by the determination of parking spots for individual cars is the individual temperature in the car after the parking period or an average or minimum or maximum temperature of a number of cars (20, 21, 22) for which parking spots are determined at the end of the individual parking periods or estimated end times of parking periods.

In some embodiments, the parameter that is optimized by the determination of parking spots (23, 24, 25, 26) for individual cars is the overall fuel consumption of an individual car or of the cars for which parking spots are determined taking into consideration the fuel consumption of the driving engine for transport of the car(s) (20, 21, 22) to and from the parking spot(s) as well as the fuel consumption of an air condition system of the car(s) that is needed for cooling down the car(s) to a standard temperature.

In some embodiments, the parameter that is optimized by the determination of parking spots (23, 24, 25, 26) for individual cars (20, 21, 22) is the overall production of environmentally detrimental substances of an individual car or of the cars for which parking spots are determined taking into consideration the production by the driving engine(s) for transport of the car(s) to and from the parking spot(s) as well as the production by the driving engine(s) while driving an air condition system of the car(s) for cooling down the car(s) to a standard temperature.

In some embodiments, the parameter that is optimized by the determination of parking spots (23, 24, 25, 26) for individual cars (20, 21, 22) is the walking distance between the parking spot (23, 24, 25, 26) that is selected and the presumed or known preferred pedestrian entrance (46, 47).

As another example, some embodiments include a car with a vehicle parking assistance system according to the description above.

As another example, some embodiments include a method for vehicle parking assistance comprising the following activities: receiving measured thermal values and availability data that are linked to a one or more parking spots (23, 24, 25, 26); and determining target parking spots for one or more arriving vehicles/cars (20, 21, 22) on the basis of at least availability and/or attractiveness data and thermal values.

In some embodiments, the method includes the activity of storing measured thermal values that are linked to parking spots in a database.

In some embodiments, the method includes the activity of classifying the parking spots (23, 24, 25, 26) of a parking area according to the level of information that is available in the database (14) about each individual parking spot, and, if two parking spots with different levels of information in the database are available for an arriving car, proposing to a car (20, 21, 22) the parking spot for which a lower level of information is available.

BRIEF DESCRIPTION OF THE DRAWINGS

Different implementations of the teachings of the present disclosure are shown in the drawings and will be described and discussed below. Therein.

DETAILED DESCRIPTION

Figure 1:
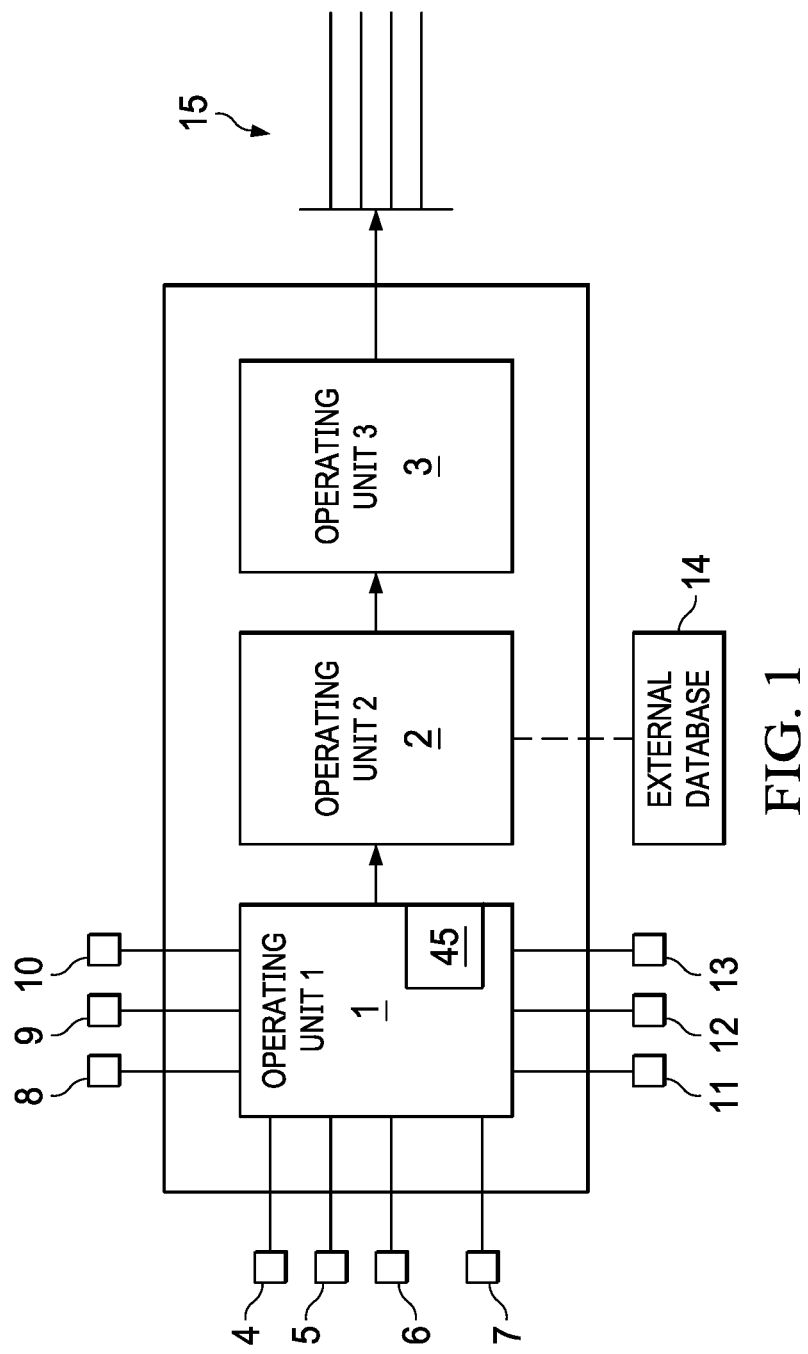
FIG. 1 shows a first, a second, and a third operating unit of a vehicle parking assistance system incorporating teachings of the present disclosure.

The teachings of the present disclosure include vehicle parking assistance systems comprising a first operating unit comprising means for receiving measured thermal values that are linked to parking spots, means for receiving availability data and/or attractiveness data that are linked to one or more parking spots, means for storing measured thermal values that are linked to individual parking spots, and means for determining target parking spots for one or more arriving cars on the basis of availability and/or attractiveness data and thermal values.

In some embodiments, there are means for receiving measured thermal values and availability and/or attractiveness data that are linked to one or more parking spots; a second operating unit that is able to store measured thermal values that are linked to parking spots in a database; and a third operating unit comprising means to determine target parking spots for one or more arriving vehicles on the basis of availability and/or attractiveness data and thermal values. In some embodiments, there is a data processing unit that comprises the first, second, and third operating units; however, the three operating units can also be implemented separately. One or more of the operating units may be implemented in hardware form or in the form of a software module.

In some embodiments, the first operating unit comprises means for receiving measured values and may be directly connected to sensors that measure the respective values. The connection of the first operating unit with the sensors may be implemented by way of a radio communication interface or a wire connection or any available means of communication. In some embodiments, data transfer may be implemented using known data exchange/communication standards. Sensors may be installed on or near each parking spot or at remote positions from where the sensors may be able to produce measured values that refer to a single parking spot (e.g., a pyrometric sensor, a light sensor, and/or a camera).

Respective measured thermal values may be stored by the second operating unit with a link to the individual parking spot they refer to, and the thermal values as well as the parking spot identification may be exchanged with a local or remote database. A target parking spot for a car that arrives at a parking area may be determined on the basis of availability and/or attractiveness data and thermal values, wherein the thermal values and the availability and/or attractiveness data comprise a selection of parameters and information items that will be discussed in more detail below. The first and second operating units may also be combined in one single operating unit.

In some embodiments, the first operating unit and/or any other operating unit of the parking assistance system is connected to sensors sensing whether an individual parking spot is occupied by a car. These sensors may be installed in or at each individual parking spot or in a remote position from where information about the status of each parking spot is available. The availability sensors may be connected to the first and/or other operating unit by a radio interface or by a wired connection.

In some embodiments, the third operating unit may determine and indicate a specific parking spot to an arriving car by a radio connection or other available means of communication. Each individual car arriving at the parking area may signal its arrival to the parking assistance system, or the parking assistance system may comprise sensors that detect and signal to arriving cars at a vehicle entrance point or on a road next to the parking area. Arriving cars may also be sensed and welcomed by a satellite-based system that analyzes continuously or periodically taken pictures of the parking area. Also, other means for sensing the passing-by of cars at a control point at, near, or before the entrance to a parking area may be used for the purpose described. The third operating unit may also be combined with the second operating unit in one single operating unit.

In some embodiments, the vehicle parking assistance system may send to each individual vehicle a signal describing a target parking spot or a route that leads the car from its current position to the parking spot. The vehicle parking assistance system may also contact a navigation system on a car and modify routing information used by the navigation system in order to lead the car to the target position. Also, other navigation elements may be used such as, for example, lights or other signaling elements in the parking area that give signals to the drivers of circulating cars and lead them to their individual target parking spots. For example, traffic control signals or similar light signals may be used for this purpose.

In some embodiments, a vehicle parking assistance system uses thermal values that are receivable by the first operating unit and comprise one or more of the group of: temperatures measured at or on parking spots outside of cars, temperatures measured at parking spots inside a car, radiation intensity the parking spot or a car on the parking spot is exposed to, wherein the radiation is originating from the sun, radiation intensity to which the parking spot or a car on the parking spot is exposed, wherein the radiation is originating from other sources than the sun, air temperature, surface temperature of the floor of the parking spot, heat capacity and/or heat conductivity of the material of which the floor of the parking spot consists, local wind velocity, local direction of wind, air humidity, information about cars occupying neigbouring parking spots, information about buildings in the neighborhood of the parking spot, information about heat sources and/or heat sinks in or near the parking area, weather forecasts concerning temperature, weather forecasts concerning solar irradiation, and weather forecasts concerning wind velocity and/or direction.

One or two or more or even all of the parameters and items of information listed above may be used as thermal values that are taken into consideration by the parking assistance system in order to select a target parking spot for one car or a number of parking spots for a number of arriving cars. Temperatures measured at parking spots inside cars may be communicated to the parking assistance system from the individual cars or data processing units in the cars by a radio communication connection. A large number of factors that have the potential to influence ambient temperature and/or interior temperature of a car exist and may be factored into the calculation used for determining the best available parking spot.

Radiation originating from the sun may comprise sunbeams in the optical and infrared ranges. This kind of radiation transports energy to and into the parked cars. Also, the time of day and/or the season may be taken into consideration since the angle of the sun with regard to the horizon and the geographical direction of solar radiation can be taken into consideration when calculating the radiation entering the car by its glass windows. Air temperature may also be measured or taken from an available data source, e.g., the internet or another service. The temperature of the parking spot's ground surface may be measured by a temperature sensor and/or by a pyrometer that is sensitive to infrared radiation. The heat capacity and/or heat conductivity of the material that the ground surface of the parking spot consists of should be known to the parking assistance system. The local wind velocity and local wind direction as well as air humidity may also be measured on site or taken from respective information services, e.g., from the internet.

Information about cars occupying adjacent parking spots relates, for example, to the height and length of a car that might offer shadow to the parking spot that is still available. A large car on an adjacent parking spot may also shield the parking spot from wind. The same is true for buildings that may offer shadow and shielding from wind. A building near the available parking spot may also be a heat source or a heat sink. The same holds for areas of greenery such as trees or bushes that may offer shadow and may act as heat sinks.

Forecast data for temperature, solar irradiation, and/or wind velocity/direction may also be taken into consideration, particularly if the parking period is a longer one and the conditions shortly before leaving the parking spot are to be predicted and taken into consideration.

In some embodiments, availability and/or attractiveness data comprise one or more of the group of: information if the parking spot is occupied, information about thermal properties of the arriving car, information about the size and/or appropriateness of the parking spot for the individual car, information about the fuel consumption of the car, information about the generation of environmentally detrimental substances by the car, driving distance of the parking spot from an entrance of the parking area by which the arriving car enters the parking area, and walking distance of the parking spot from a known individual goal of the driver or from a potential point of interest for passengers/drivers.

One basic item of information concerning the target parking spot or an available parking spot is its availability, that is, information as to whether a car is parked on the parking spot or not. This may be sensed by light sensors or a camera taking a picture of the parking spot or a group of parking spots and a picture analysis unit that compares the picture of an unoccupied parking spot with the current picture. As a result, a signal is generated that informs the parking assistance system whether a parking spot is occupied or not. Alternatively, other kinds of sensors such as, e.g., weight sensors, may be used on the parking spots.

Availability and/or attractiveness data may also comprise information about the thermal properties of the arriving car. This includes, for example, the thermal insulation of the car, the size of the windows through which sunlight may enter the car, and properties of the windows such as, for example, the transparency of the glass.

In some embodiments, information about the size of the parking spot as well as about the size of the arriving car may be taken into consideration as availability data. Whether a parking spot is reachable by the arriving car at all (due to the properties of the route from the entrance of the parking area to the target parking spot) may also be taken into account. Also, it might be the case that particular regions of the parking area are reserved for specific kinds of cars, such as trucks, or are reserved for specific groups of drivers, such as women or the elderly, in order to offer them parking spots close to pedestrian access points to the parking area. Insofar, properties of the driver may be part of the availability/attractiveness data.

Particular importance may also be assigned in the data to the walking distance from the parking spot to a known individual destination of the driver or to a potential point of interest for passengers/drivers.

Thus, the vehicle parking assistance system may check first into which of the unoccupied parking spots an arriving car fits on the basis of the properties of the car and the size and position of the parking spot, and then a second selection may be made in order to select one target parking spot, taking into consideration additional data such as the thermal data of the parking spots.

In some embodiments, the third operating unit in order to determine target parking spots for arriving vehicles uses continuously or periodically measured and transferred thermal values and/or thermal values that are stored in the database and/or thermal values that have been predicted on the basis of thermal values that are stored in the database. Some of the thermal values may be fixed while others may vary with the weather, season, time of day, and other changeable conditions. Basically, the vehicle parking assistance system may select target parking spots on the basis of thermal values that are stored in a database. The parking assistance system can improve its operation if currently measured parameters of thermal values are taken into consideration. These measured values may also be stored in a database by the second operating unit in order to update the database or make the stored data more reliable.

In some embodiments, availability and/or attractiveness data of a parking spot for one arriving car are determined on the basis of a comparison of availability and/or attractiveness data of several available parking spots for more than one arriving car. The system may also comprise means for receiving and/or determining an expected or estimated period of parking time and for taking it into consideration when determining a parking spot. In this case, the assessment of thermal values may be focused on a time period shortly before the driver intends or is expected to remove his car from the parking spot.

The system may also comprise a fourth operating unit that classifies the parking spots of a parking area according to the level of information that is available in the database about each individual parking spot, wherein, if two parking spots with different levels of information in the database are available, the fourth operating unit proposes to a car the parking spot for which a lower level of information is available. This method enables the system to complete information about all parking spots in an area as soon as possible. By proposing parking spots for which less data is available than for other parking spots, information is predominantly collected about parking spots that are not yet well known by the system. This is particularly important for vehicle parking assistance systems that are not centrally managed and located in or at the parking area or at least fixedly connected to the parking area, but which are rather installed in a car that uses several different parking areas. In the latter case, the system installed in the car should collect as much data from different parking areas as possible in a short time. The system may also provide means to exchange such information with systems in other cars that use an overlapping number of parking areas.

In some embodiments, the parameter that is optimized by the determination of parking spots for individual cars is the individual temperature in the car after the parking period or an average or minimum or maximum temperature of a number of cars for which parking spots are determined at the end of the individual parking periods or estimated end times of parking periods. This optimization scheme may predominantly be used in hot weather or intense solar irradiation conditions, such as in summer from 10.00 a.m. to 6.00 p.m. and/or in geographical regions that generally have hot weather. This optimization scheme may also be used permanently or in wintertime in order to achieve higher temperatures inside the parked cars.

In some embodiments, optimization of temperature within the car may also be coordinated with other optimization parameters. For example, the parking assistance system may provide that the parameter that is optimized by the determination of parking spots for individual cars is the overall fuel consumption of an individual car or of the cars for which parking spots are determined taking into consideration the fuel consumption of the driving engine for transport of the car(s) to and from the parking spot(s) as well as the fuel consumption of an air condition system of the car(s) that is needed for cooling down the car(s) to a standard temperature. In this case, the fuel consumption, and hence the costs of driving the car, may be optimized.

In some embodiments, the parameter that is optimized by the determination of parking spots for individual cars is the overall production of environmentally detrimental substances of an individual car or of the cars for which parking spots are determined taking into consideration the production by the driving engine(s) for transport of the car(s) to and from the parking spot(s) as well as the production by the driving engine(s) while driving an air condition system of the car(s) for cooling down the car(s) to a standard temperature. In this case in particular, it makes sense to combine the optimization potential of a greater number of cars because the outcome does not pay off for the individual car user/driver but for the environment and for society at large. For using the optimization scheme, the individual driver may, however, receive an incentive such as money or a money equivalent, such as bonus points for a mall or a reduction of the entrance fee to a museum that uses the parking area.

In some embodiments, the parameter that is optimized by the determination of parking spots for individual cars is the walking distance between the parking spot that is selected and the presumed or known preferred pedestrian entrance.

Some embodiments include a car provided with such a vehicle parking assistance system on board, wherein the system may offer one or more of the features described above. Some embodiments may include a method for vehicle parking assistance comprising the following activities: receiving measured thermal values and availability data that are linked to a one or more parking spots, and determining target parking spots for one or more arriving vehicles on the basis of at least availability and/or attractiveness data and thermal values. In some embodiments, the method includes the activity of storing measured thermal values that are linked to parking spots in a database. In some embodiments, the method includes the activity of classifying the parking spots of a parking area according to the level of information that is available in the database about each individual parking spot, and, if two parking spots with different levels of information in the database are available for an arriving car, proposing to a car the parking spot for which a lower level of information is available.

FIG. 1 shows a first operating unit 1, a second operating unit 2, and a third operating unit 3 of a vehicle parking assistance system, wherein the first operating unit 1 is connected to sensors 4, 5, 6, 7 that provide thermal values of parking spots such as temperature, air humidity, wind velocity, wind direction, etc. The connection between the operating unit 1 and the sensors may be effected via wires or via a radio connection. The first operating unit 1 is further connected to sensors 8, 9, 10 that provide availability data. The sensors 8, 9, 10 may comprise, for example, cameras that provide pictures of the parking area, local sensors that are located in the individual parking spots, or a transceiver, and communicate with respective transceivers on board of parking cars.

The first operating unit 1 may also be connected with data sources/sensors 11, 12, 13 providing data about arriving cars for which parking spots have to be selected. The data sources/sensors 11, 12, 13 may, for example, be radio receivers receiving signals from arriving cars, for example from navigation systems of arriving cars or from a transmitter on board of an arriving car that is activated by the driver who wants to park the car, or from sensors that sense the passing of a car at the car entrance to the parking area or at a point of a driving lane inside the parking area.

Thermal values that are received by the first operating unit 1 may be sent to the second operating unit 2, which stores thermal values linked to individual parking spots. The thermal values may also be linked to the time of day or the season during which the data have been collected. The data may also be cross-referenced with weather forecasts from public sources such as the internet or radio so that thermal values for a future time can be derived for an individual parking spot. The first operating unit may also comprise means 45 for receiving, assessing, or estimating a period of time that the car will spend on the parking spot before leaving, or for assessing, receiving, and/or estimating a projected leaving time at which the car will leave the parking spot. A leaving time may be thus taken into consideration when the thermal values are being considered.

The second operating unit 2 may be linked to an external database 14 that may be publicly accessible and may be located inside or outside the parking area. Data may, however, also be stored within the vehicle parking system, for example, within the second operating unit 2.

In some embodiments, the data on the thermal values and the availability and/or attractiveness of a parking spot for an arriving car are then used in the third operating unit 3 to determine a target parking spot for one arriving car. The third operating unit may operate according to one or more optimization algorithms and optimize the individual target parking spots in order to achieve optimization of the temperature inside the car, overall fuel consumption of the car taking into consideration the operation of an air conditioning system and the driving engine, or overall production of environmentally detrimental substances by the car through operation of the engine. Optimized determining of target parking spots may also take into consideration overall optimization for more than one car, for example a fleet of cars parked in the parking area.

In some embodiments, the output of the third operating unit 3 comprises a list 15 of cars and selected target parking spots for the individual cars. The information about which target parking spot has been reserved for a specific car may be sent to the car or may be transformed into signals of a signaling system that is installed in the parking area, for example in the form of traffic control signals that show the way from the parking area car entrance to the selected individual target parking spot for each arriving car. The target parking spot may, for example, also be sent to the navigation system of each arriving car, leaving navigation to the target parking spot to the car's navigation system.

Figure 2:
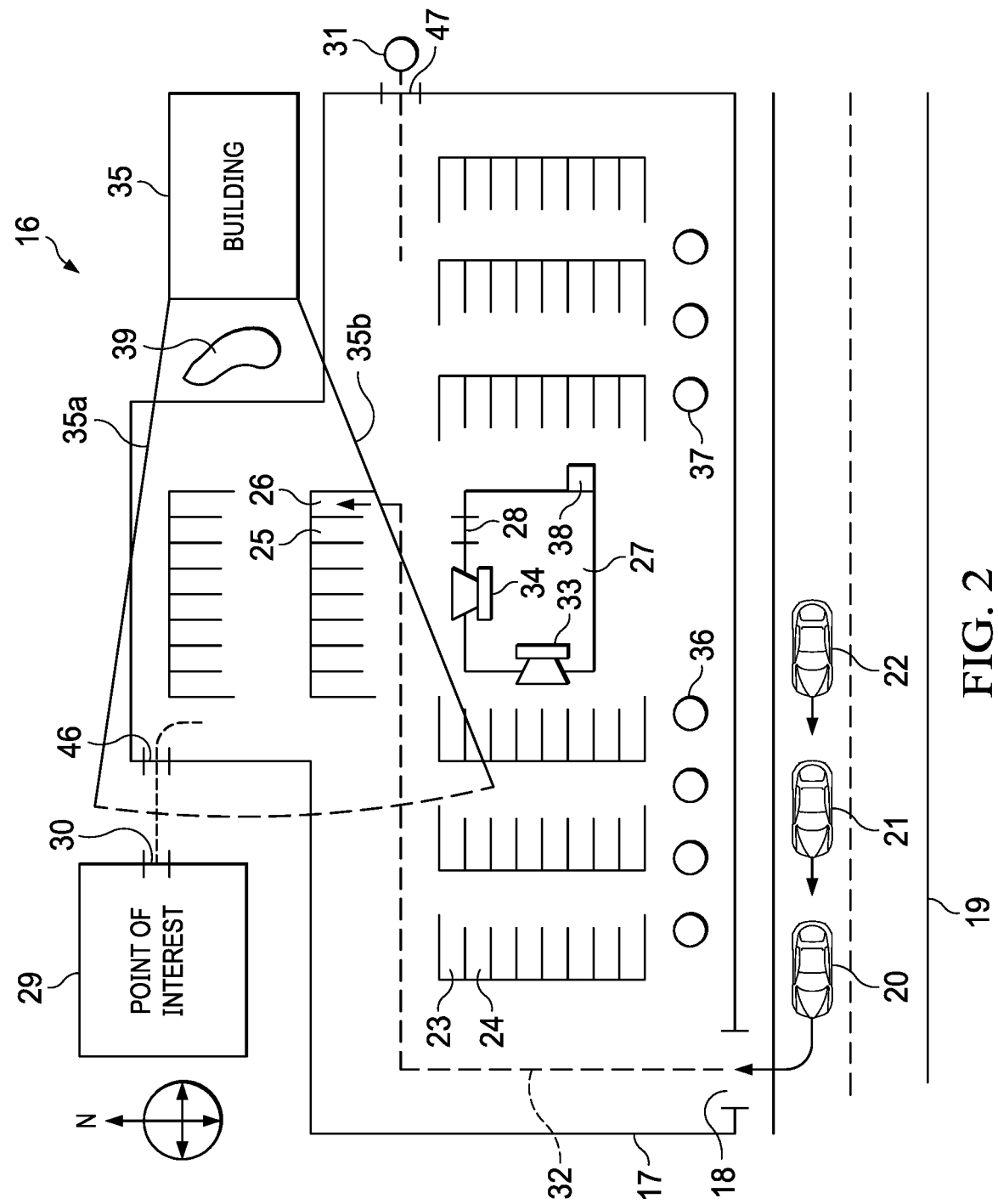
FIG. 2 shows a parking area with a number of details that influence thermal values and the availability and/or attractiveness of parking spots incorporating teachings of the present disclosure.

FIG. 2 shows, in a view from above, a parking area 16 surrounded by a fence 17. In the fence 17 a car entrance 18 is provided as an opening that connects the parking area 16 to a road 19. In FIG. 2, three arriving cars 20, 21, 22 are marked for which parking spots are to be selected. Parking spots 23, 24, 25, 26 are symbolized by open rectangular boxes such as used for marking individual parking spots on the surfacing of a parking area. The parking spots 23, 24, 25, 26 of the parking area 16 are located around a mall 27 that is the usual point of interest for the drivers of arriving cars. Therefore, one parameter defining the attractiveness of a specific parking spot is the distance from the parking spot to the entrance 28 of the mall 27. However, some other points of interest near the parking area 16 also exist and are marked with 29 (a museum with a pedestrian entrance 30) and 31 (which could be, for example, a public restroom).

Along potential driving trajectories 32 of the cars, sensors may be located that sense the passing of a car and send respective information to the first operating unit 1. Cameras 33, 34 are located on the mall building 27 and take pictures of the parking area that can be digitally analyzed to derive information about the individual availability of the parking spots 23, 24, 25, 26. Factors that influence thermal values of individual parking spots include, for example, a high building 35 located next to the parking area 16, which generates a shadow at sunrise. The shadow is marked by lines 35a, 35b and helps to keep parking spots 25, 26 cool in the early morning hours. Other objects that may have an effect on the thermal values or individual parking spots are, for example, trees 36, 37 located in the south of the parking area 16, which generate shade for at least some of the parking spots at the south end of the parking area.

At the mall 27, the external part of an air conditioning system 38 forms a heat source that may influence the temperature of the parking spots next to it. Further, a pond 39 is marked outside the parking area 16 and acts as a heat sink and a source of humidity and can lower the temperature of nearby parking spots, such as parking spots 25, 26, on hot days. When external temperatures are low, for example in winter, the pond may on the other hand act as a source of heat so that at parking spots near the pond 39 the freezing-over of car windows can be avoided. That is, optimization of temperature for a parking spot does not necessarily mean assigning a parking spot with a low temperature but could also comprise, in winter, assigning a parking spot that exposes a car to a temperature above 0 degrees Celsius.

Selecting target parking spots for arriving cars 20, 21, 22 may take place before the first of the cars has arrived at its target parking spot or even before the first car has arrived at the parking area. In this way, an optimization total representing the greatest total advantage for a given distribution of arriving cars to available parking spots can be calculated, and parking spots may be selected and assigned to the arriving cars on the basis of a most advantageous optimization total for all cars.

Figure 3:
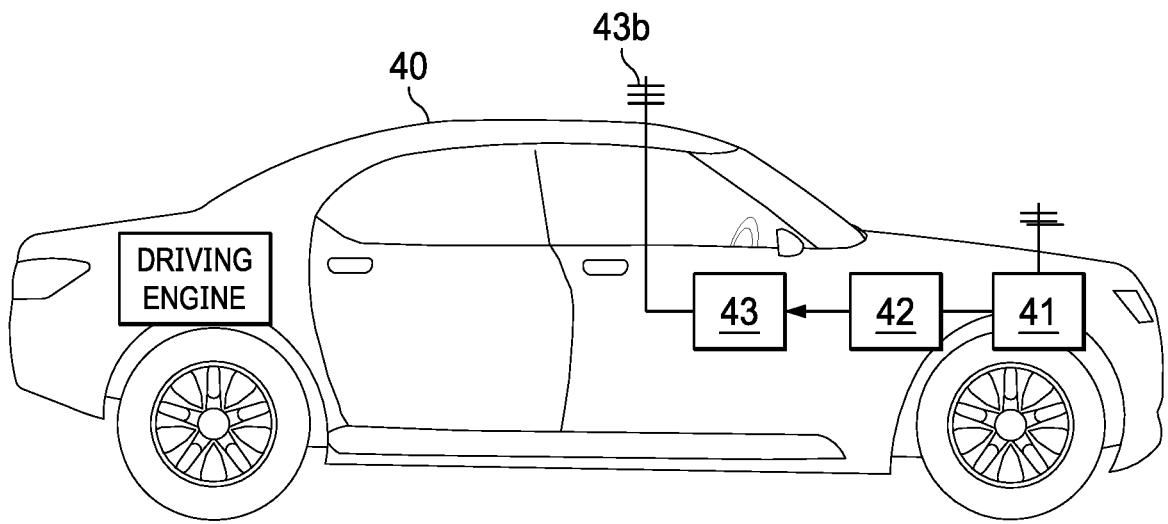
FIG. 3 shows a car with a built-in parking assistance system incorporating teachings of the present disclosure.

FIG. 3 shows a car in a schematic view wherein at least some parts or all parts of a vehicle parking assistance system are located on board of the car 40. For this purpose, the car 40 comprises a transmitter/receiver for communicating with sensors providing information about thermal values and the availability/attractiveness of parking spots. The three operating units 1, 2, 3 as well as an additional operating unit 44 (described in detail below) may be located on board of the car 40, the first operating unit 1 being connected to the radio transceiver 41. The vehicle parking assistance system in the car is represented by the unit 42, which may also contain storage means for storing thermal values and building a database. The unit 42 may, however, also communicate with an external database and store data in the database as well as receive data from the same database.

As soon as a parking spot has been selected by the unit 42 (parking assistance system), an indication of an available and optimized target parking spot is sent to the car navigation system 43, which navigates the car to the target parking spot. The car 40 may continuously or periodically communicate with other cars that have similar onboard vehicle parking assistance systems in order to avoid an available parking spot being selected by more than one car at once. Rules may be set up for the selection of target parking spots such as "first come, first served" or assigning a parking spot to a car for which the parking spot is optimized. In some embodiments, the navigation system 43 may receive information about a selected parking spot via an antenna 43b and a radio interface from a parking assistance system that is located on site within a parking area and not aboard the car.

Figure 4:
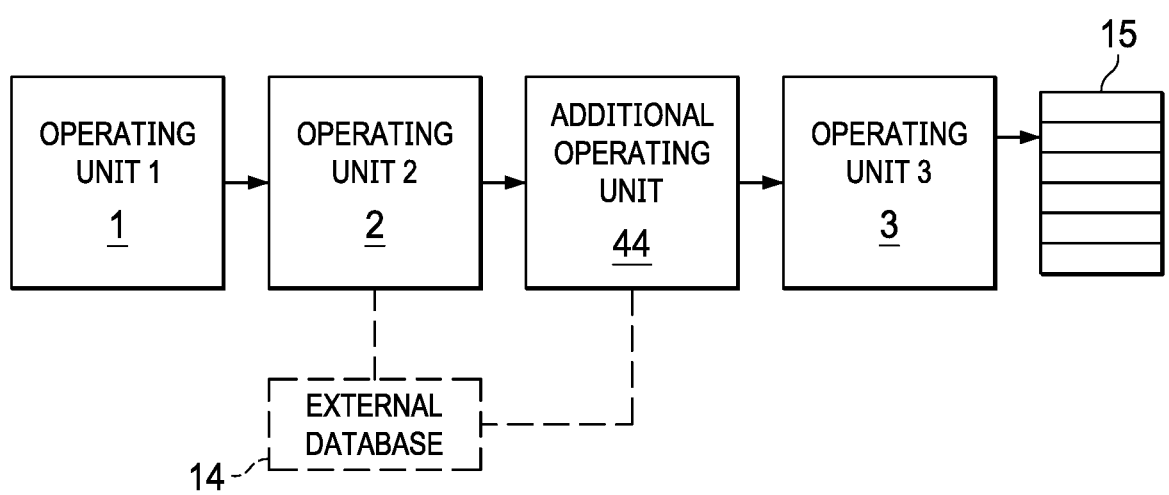
FIG. 4 shows a first, a second, a third and a fourth operating unit of a vehicle parking assistance system incorporating teachings of the present disclosure.

FIG. 4 shows a vehicle parking assistance system with three operating units 1, 2, 3 wherein the operating units 1, 2, 3 have the same function as described above with regard to FIG. 1. External data/information is received by operating unit 1, and operating unit 2 communicates with a data pool containing thermal values of parking spots, operating unit 2 potentially also communicating with an external database 14. FIG. 4 additionally shows an additional operating unit 44 that influences the selection of a target parking spot. The operating unit 44 makes an assessment of potentially available parking spots for a car and also takes into consideration whether for each of the potentially available parking spots thermal value data are available in the database. The additional operating unit 44 is particularly helpful if the vehicle parking assistance system is at least partially installed on board of a car. In that case, the individual car may have access to a database containing data that have been acquired by sensors on board of the car itself or other cars. This means that the car itself, or a number of cars, must collect experience about parking spots that are of continuing interest to their drivers, for example because they are close to the homes or workplaces of the drivers. In that case, the operating unit 44 prefers a parking spot for which only little or no information is already available in the database. Over time this leads to a buildup and optimization of data available in the database.

In some embodiments, the operating unit 3 takes the preferences of operating unit 44 into consideration and provides as output a list of available parking spots or just information about one optimized target parking spot. Below, a number of scenarios for different optimization schemes are described for the vehicle parking assistance system according to the invention. It should be noted that a selection from or a combination of various features of all scenarios should also be regarded as an implementation of the present invention.

Optimization Scheme 1: Spot Fill-Up

Once the vehicle enters the parking area, it is directed to an available parking spot appropriate in size, closest to the targeted (presumed or known) pedestrian entrance. This optimization allows for the latest parking spots to be filled while the latest incoming drivers reach them with no trouble in finding them. Additionally, this allows designing parking areas with spots of different sizes, these parking areas, therefore, being able to accommodate more vehicles on the same surface area compared to classical parking areas.

Smaller cars, once all small size parking spots are occupied, are directed to vacant large size parking spots. When a small size car and a large size car need to be directed toward two large size parking spots roughly at the same time, the larger car is generally directed toward the place that is closer to it, which makes for an overall saving of fuel for the entire sequence.

Optimization Scheme 2: Shortest Path

Based on vehicle identification, the system is able to estimate the scenario with the lowest fuel consumption for going in and out of the parking area with regard to path length. This scheme retains the advantages of Scheme 1, however, a goal of reducing fuel consumption and, implicitly, emissions inside the parking area by shortening the distance to be traveled is additionally satisfied. As a condition either imposed by the parking area regulation or freely chosen by the driver (default or user setting), the system shall direct each incoming vehicle toward the vacant spot that involves the shortest distance from the entrance to the parking spot to the exit. As the ultimate goal is to reduce fuel consumption, the "shortest distance" condition is balanced with estimations of whatever additional consumption might be involved if, on a short stretch, numerous turns or stops are needed and lead to fuel loss.

In this regard, for a parking area of limited size, with the anticipated situation of being almost fully occupied, smaller cars are generally directed so as to first fill the parking spots that imply longer paths inside the parking area so that spots requiring short traveling distances are reserved for larger vehicles. This "go green" option may be explicitly prompted to the driver, as a popup on the screen or as a voice question, each time the driver enters a parking area. Additionally, further information may be transmitted to the driver about the impact of taking the "go green" option, such as:

fuel saved (e.g., in grams)
  NOx emissions avoided (e.g., in grams)
  amount of heating avoided (e.g., in joules or calories)
  money saved (in whatever relevant currency).

The decisions can be memorized separately for different parking areas by the system or on board of the car. Each "go green" decision may be rewarded with a number of bonus points, and a given number of bonus points may be turned into vouchers (for example, to be used for discounts in a shopping mall).

Optimization Scheme 3: Best Thermal Experience

Once the vehicle enters the parking area, its type, and implicitly its size and thermal insulation characteristics, is sensed by sensors or transmitted by the car to the parking assistance system. During a typical summer day, the system directs the incoming vehicle to an available parking spot appropriate in size and ranked as the coolest at that specific season/time of day. The system acts in an opposite fashion during a typical winter day. Having taken its allotted spot, the vehicle streams its own thermal readings to the operating units, thus refining the spot's thermal profile in the database. For a determined day of the year and concrete hour, variants of the thermal profile are valid which consider such aspects as:

current temperature and humidity
  sky condition (sunny, rainy, overcast, etc.)
  weather forecast
  known or presumed duration of stay
  presence of any vehicles in the adjacent spots that can block the sunlight, at least partially, and can act as heat sinks, lowering the local temperature for a while.

In other words, a parking spot with no surrounding vehicles may switch rank in a preferability scale with another parking spot that is adjacent to a spot in which a larger and/or taller car, such as a minivan, is parked and provides shade during that time of the day. Upon returning to the vehicle, the driver finds the temperature inside the vehicle at or near comfort level, or a comfort level can be reached within a minimal operation time of the air-conditioning system.

In an embodiment involving a two-way communication between system and parked vehicle, the system may additionally, but not necessarily, further improve the thermal conditions inside the parked cars by triggering the opening of a venting slit (about 1-2 cm) in the door windows or the sunroof, and the closing thereof. For a parking area of limited size, with the anticipated situation of being almost fully occupied, better insulated cars are generally directed so as to first fill the warmer spots that imply higher undesired temperature levels inside the parking area, so that cooler spots are reserved for vehicles with poorer insulation. Thereby, overall fuel consumption is reduced. Cooler spots may, in another implementation, also be reserved for cars that require more energy to be cooled down, e.g. because of their size.

The "go green" option can be explicitly prompted to the driver as a popup on the screen or a voice question each time the driver enters a parking area. Additionally, more information may be transmitted to the driver about the impact of taking the "go green" approach, such as:

fuel saved (e.g., in grams), for own vehicle or for "the Earth"
NOx emissions avoided (e.g., in grams), for own vehicle or for "the Earth"
amount of heating avoided (e.g., in joules or calories), for own vehicle or for "the Earth"
money saved (in whatever relevant currency).

The decisions may be memorized for different parking areas by the system and/or on board of the car. Each "go green" decision may be rewarded with a number of bonus points proportional to the estimated overall impact on fuel saving for the entire parking area generated by the "go green" option. A given number of bonus points may be turned into vouchers to used, for example, in a shopping mall for discounts. A "go green" club in a shopping mall, for example, may offer permanent discounts.

Optimization Scheme 4: Lowest Energy Consumption

This scheme involves computations pertaining to Scheme 2 and Scheme 3. For each incoming vehicle an assessment is made, considering its type and implicitly its size and thermal insulation characteristics, and also the vacant spots and their thermal ranking. The assessment predicts which parking spot involves the lowest fuel consumption, calculated from the total fuel expended for:

reaching the parking spot
exiting the parking area
bringing the temperature inside the vehicle back to a comfort level.

If the goal is to reduce the overall fuel consumption and implicitly also the emissions inside the parking area in general, then the largest vehicles featuring the poorest insulation must be directed to the coolest available parking spots close to the entrance.

The "go green" option can be explicitly prompted to the driver as a popup on the screen or a voice question each time the driver enters a parking area. Additionally, more information may be transmitted to the driver about the impact of taking the "go green" approach, such as:

fuel saved (e.g., in grams), for own vehicle or for "the Earth"
NOx emissions avoided (e.g., in grams), for own vehicle or for "the Earth"
amount of heating avoided (e.g., in joules or calories), for own vehicle or for "the Earth"
money saved (in whatever relevant currency).

Below, particular implementations of the invention and potential implementations of elements of the parking assistance system are described. These implementations shall not limit the scope of the invention and may also comprise elements that are not necessarily integrated into the system, but may cooperate with elements of the parking assistance system.

Parking Area Ticketing Sub-System

Once an incoming vehicle is sensed, the assistance system triggers a parking area ticketing sub-system to automatically create and transmit a virtual parking ticket consisting of a unique digital code. The system is informed about the new parking spot occupant. Once the vehicle leaves the parking area, sensors, e.g. cameras, inform the system about the vacancy of the parking spot corresponding to the ID of the parking ticket. In some embodiments, the system or sub-system may charge or reward, in actual money, for the services provided in proportion to the services provided and/or to the positive environmental impact.

A system can be envisaged that would charge the driver of a large, poorly insulated vehicle parked in an advantageous spot while rewarding the driver of a smaller and/or well-insulated vehicle parked in a disadvantageous spot, and also deduct a fee for the services rendered. The system may thus additionally provide a financial balance between parking area occupants and also charge for the parking assistance service. As a warmer vehicle needs to expend more fuel in order to reach a temperature comfort level, the assistance system cuts cost for all parking area occupants in an equitable manner.

In effect, upon entering a parking area of a considerable size (such as a mall parking area), the incoming vehicle (or its driver) receives the best possible directions with regard to thermal comfort, i.e., cooling in summer, warming in winter. The thermal profile of a parking spot uses as a basis thermal readings made in the past, which are not directly deducible from the position of the sun, the date, the hour, and the height of a neighboring building only, but also take into account all other local factors such as neighboring vegetation and/or larger tracts of asphalt, the general wind direction, the proximity of rivers or sprinkler systems, etc. Each visiting car contributes to improving the database by sharing its own thermal readings with other cars or a local system while parked. The same idea can be extended to a neighborhood (such as a residential neighborhood) where neighbors share, via the vehicles, thermal information that is read while the cars are parked. When entering the neighborhood, the best parking spot close to one's home can thus be recommended.

On-Board Parking Assistance System

In some embodiments, the parking assistance system is entirely or mainly placed inside each vehicle. The on-board parking assistance system is able to learn the temperature-pertaining aspects of areas where the vehicle is parked repeatedly. Such a system could mainly prove useful in residential areas or in parking areas where no other overall supervision is installed.

On-Board System Use Case 1: Learning the Thermal Patterns of Specific Parking Areas Targeted Scenario 1: Parking Next to One's Home after Returning from Work.

In this scenario, the car leaves between 7 and 9 a.m. and returns between 6 and 8 p.m. In many residential areas, there are no dedicated parking spots; therefore, the parking place occupied by a specific vehicle can vary from one day to the next. The learning phase for the areas most frequented by a car includes storing information related to:

interior temperature of the vehicle
global positioning
time of year and day
car model.

Once sufficient data has been gathered by the system about a specific parking zone (for example after one month), the system can recommend to the driver a specific parking spot out of several inside an area, such as a residential area or a workplace parking area, a parking spot connected to a thermal pattern predicted as most suitable for the driver and/or the vehicle. As an effect that might be achieved in summer just by parking a few meters closer to one's house, the temperature inside the car in the morning could for example be reduced significantly. As an effect that might conversely be achieved in winter, the interior temperature of the car in the morning could for example be increased from to above 0° C. by parking a few meters closer to one's house, thus preventing frosted-over windows by the time the driver arrives, saving fuel and time needed for defrosting before departure. This embodiment implicitly considers conditions such as the mass and materials of the vehicle, local vegetation (bushes, small trees, . . . ), the proximity of sprinkled gardens, rivers, etc.

Targeted Scenario 2: Parking Next to One's Home Under Consideration of Business and Holiday Behavior The day of the week and the time of year may be included as inputs in the learning and in the establishment of thermal patterns, and optionally also the driver's own agenda. For example, Sundays to Thursdays the system could recommend a parking spot that can bring the interior temperature of a car to 20° C. at 8 a.m. on the next morning, whereas on Friday and Saturday evenings another parking spot would be recommended because of a different behavioral pattern of the driver (who leaves home at 11 a.m. on Saturdays and Sundays). Parking on the same parking spot as on Sundays to Thursdays could otherwise bring the vehicle to a predictable discomfort temperature such as 35° C. at 11 a.m. on the next morning.

The annual cycle of the positions of the sun may be considered as well and recommending a parking spot may be adjusted by season. As an additional consequence of thermal supervision the daily span of temperature variance would decrease for the vehicle, which would have a positive impact on the service life of the vehicle.

On-Board System, Use Case 2: Learning Application for User-Defined, Specific Parking Areas An application may be developed having the following features:

The user (driver) declares a specific parking area that he or she wants to use.

The user (driver) adjusts the spatial tolerances to the desired parking area or accepts the default value.

The user (driver) specifies the number of calibrating iterations during the "learning process" (hence the precision) or accepts the default value.

The assistance system starts recording data (localization and temperature variation) at every instance of parking in the specified area.

The assistance system makes a proposal to the driver of changing the current specific parking spot, inside a specific area, if sufficient information on the current spot was already collected on a previous instance of parking.

The assistance system, once sufficient data have been collected, prompts the driver to either accept parking spot recommendations fitting the desired thermal profile or to extend the calibration with additional parking instances.

The assistance system predicts the impact of season on the thermal profile and, as the case may be, asks the driver to perform an additional, shorter, season-specific calibration.

The assistance system saves the thermal profile of specific, user-defined parking areas (for example as "work", "home", "mall", etc.) in a cloud so that the driver can easily share his or her own experiences with another vehicle or share it with other users (family, colleagues).

Additionally, work colleagues or neighbors may contribute together to the calibration of a specific parking area, sharing the data in a cloud system that is eventually able to also compute the optimal parking spot for each parking request from the thermal point of view.

A new driver/vehicle may be directly granted access to a local database that has already been calibrated, for instance one belonging to the parking area of a company.

Calculation Model

In the following example of a calculation model, a parking area is considered that can host up to 300 vehicles (for example, a parking area belonging to a mall). Each car is by convention considered as being made up of 400 kg of steel and 400 kg of plastic. By assuming a thermal improvement of 5 K for each vehicle when the parking assistance system is installed, the total energy saved amounts to $$Q_{saved} = 300 \times (450 \times 400 + 1500 \times 400) \times 5 \text{ J} = 1170 \text{ MJ}$$

by considering, for simplification, $$c_{steel} \approx 450 \text{ J kg}^{-1} \text{ K}^{-1}$$

$$c_{plastic} \approx 1500 \text{ J kg}^{-1} \text{ K}^{-1}$$

By conventionally considering the efficiency of energy transformation, from chemical to thermal (through HVAC), at 50% and by considering the energy content of 1 kg of fossil fuel to be at 42.4 MJ/kg, the $Q_{saved}$ value corresponds to a mass of fossil fuel saved of:

$$m_{saved} = 55 \text{ kg}$$

By considering an average of 6 kg of fossil fuel for 100 km traveled, and 0.87 g/km of NOx emitted, an approximation of NOx avoidance can be estimated to be about:

$$m_{NOx} = 800 \text{ g}$$

These values, during a hot summer day, can be saved for every shopping session at a mall, that is every 1-2 hours.

What is claimed is:

1. A vehicle parking assistance system comprising:
   means for receiving measured thermal values associated with respective parking spots;
   means for receiving availability data and attractiveness data associated with the respective parking spots;
   means for storing measured thermal values associated with the respective parking spots; and
   means for determining target parking spots for an arriving car on the basis of availability and/or attractiveness data and thermal values;
   wherein the thermal values comprise at least one factor selected from the group consisting of: radiation intensity the parking spot or a car on the respective parking spot is exposed to, air temperature, surface temperature of the floor of the respective parking spot, heat capacity and/or heat conductivity of the material of which the floor of the respective parking spot consists, local wind velocity, local direction of wind, information about cars occupying neighboring parking spots, information about buildings in the neighborhood of the parking spot, information about heat sources and/or heat sinks in or near the parking area, weather forecasts concerning temperature, weather forecasts concerning solar irradiation, and weather forecasts concerning wind velocity and/or direction; and
   wherein the attractiveness data comprises at least one factor selected from the group consisting of: thermal properties of the arriving car, the size and/or appropriateness of the parking spot for the individual car, fuel consumption properties of the car, generation of environmentally detrimental substances by the car, and driving distance of the parking spot from an entrance of the parking area by which the arriving car enters the parking area.

2. A vehicle parking assistance system comprising:
a memory storing measured thermal values associated with respective parking spots in a database; and
a processor for receiving measured thermal values and availability and/or attractiveness data associated with the respective parking spots from the memory;
wherein the processor determines target parking spots for an arriving vehicle based at least in part on the availability and/or attractiveness data and thermal values;
wherein the thermal values comprise at least one factor selected from the group consisting of: radiation intensity the parking spot or a car on the respective parking spot is exposed to, air temperature, surface temperature of the floor of the respective parking spot, heat capacity and/or heat conductivity of the material of which the floor of the respective parking spot consists, local wind velocity, local direction of wind, information about cars occupying neighboring parking spots, information about buildings in the neighborhood of the parking spot, information about heat sources and/or heat sinks in or near the parking area, weather forecasts concerning temperature, weather forecasts concerning solar irradiation, and weather forecasts concerning wind velocity and/or direction; and
wherein the attractiveness data comprises at least one factor selected from the group consisting of: thermal properties of the arriving car, the size and/or appropriateness of the parking spot for the individual car, fuel consumption properties of the car, generation of environmentally detrimental substances by the car, and driving distance of the parking spot from an entrance of the parking area by which the arriving car enters the parking area.

3. The vehicle parking assistance system according to claim 2, wherein the thermal values further comprise at least one factor selected from the group consisting of: temperatures measured at or on the respective parking spots, temperatures measured at the respective parking spots inside a car, surface temperature of the floor of the respective parking spot, heat capacity and/or heat conductivity of the material of which the floor of the respective parking spot consists, local wind velocity, local direction of wind, information about cars occupying neighboring parking spots, information about buildings in the neighborhood of the parking spot, information about heat sources and/or heat sinks in or near the parking area, weather forecasts concerning temperature, weather forecasts concerning solar irradiation, and weather forecasts concerning wind velocity and/or direction.

4. The vehicle parking assistance system according to claim 2, wherein the attractiveness data comprise a walking distance of the parking spot from a known individual goal of the driver or from a potential point of interest for passengers/drivers.

5. The vehicle parking assistance system according to claim 2, wherein the processor uses continuously or periodically measured and transferred thermal values and/or thermal values that are stored in the database and/or thermal values that have been predicted on the basis of thermal values that are stored in the database.

6. The vehicle parking assistance system according to claim 5, wherein availability and attractiveness data of a parking spot for one arriving car depends at least in part on a comparison of availability and/or attractiveness data of several available parking spots for more than one arriving car.

7. The vehicle parking assistance system according to claim 2, wherein the processor receives and/or determines an expected period of parking time and uses the expected period of time as a criterion for selecting a parking spot.

8. The vehicle parking assistance system according to claim 2, wherein the processor classifies respective parking spots of a parking area based on a level of information available in the database about each individual parking spot, and
if two parking spots with different levels of information in the database are available, the processor proposes to a car the parking spot for which a lower level of information is available.

9. The vehicle parking assistance system according to claim 2, wherein the processor further considers a parameter to be optimized comprising at least one parameter selected from the group consisting of: an individual temperature in the car after an anticipated parking period, an average or minimum or maximum temperature of a number of cars for which parking spots are determined at respective ends of individual parking periods, and estimated end times of parking periods.

10. The vehicle parking assistance system according to claim 2, wherein the processor further considers a parameter to be optimized comprising at least one parameter selected from the group consisting of: an overall fuel consumption of an individual car for which parking spots are determined taking into consideration a fuel consumption of the driving engine for transport of the car to and from the parking spot(s) as well as a fuel consumption of an air condition system of the car that is needed for cooling down the car to a standard temperature.

11. The vehicle parking assistance system according to claim 1, wherein the processor further considers a parameter to be optimized comprising at least one parameter selected from the group consisting of: an overall production of environmentally detrimental substances of an individual car for which parking spots are determined taking into consideration the production by the driving engine for transport of the car to and from the parking spots as well as the production by the driving engine while driving an air condition system of the car for cooling down the car to a standard temperature.

12. The vehicle parking assistance system according to claim 2, wherein the processor further considers a parameter to be optimized parameter comprising a walking distance between the parking spot selected and a presumed or known preferred pedestrian entrance.

13. A car comprising:
a drive means;
a passenger compartment;
a memory storing measured thermal values associated with respective parking spots in a database; and
a processor for receiving measured thermal values, availability data, and attractiveness data associated with the respective parking spots from the memory;
wherein the processor determines target parking spots for the car based at least in part on the availability data, the attractiveness data, and the thermal values;
wherein the thermal values comprise at least one factor selected from the group consisting of: radiation intensity the parking spot or a car on the respective parking spot is exposed to, air temperature, surface temperature of the floor of the respective parking spot, heat capacity and/or heat conductivity of the material of which the floor of the respective parking spot consists, local wind velocity, local direction of wind, information about cars occupying neighboring parking spots, information about buildings in the neighborhood of the parking spot, information about heat sources and/or heat sinks in or near the parking area, weather forecasts concerning temperature, weather forecasts concerning solar irradiation, and weather forecasts concerning wind velocity and/or direction; and wherein the attractiveness data comprise at least one factor selected from the group consisting of: thermal properties of the arriving car, the size and/or appropriateness of the parking spot for the individual car, fuel consumption properties of the car, generation of environmentally detrimental substances by the car, and driving distance of the parking spot from an entrance of the parking area by which the arriving car enters the parking area.

14. A method for vehicle parking assistance, the method comprising:

receiving measured thermal values, attractiveness data, and availability data associated with respective parking spots;

determining target parking spots for an arriving vehicle based at least in part on the availability data, the attractiveness data, and the thermal values;

wherein the thermal values comprise at least one factor selected from the group consisting of: radiation intensity the parking spot or a car on the respective parking spot is exposed to, air temperature, surface temperature of the floor of the respective parking spot, heat capacity and/or heat conductivity of the material of which the floor of the respective parking spot consists, local wind velocity, local direction of wind, information about cars occupying neighboring parking spots, information about buildings in the neighborhood of the parking spot, information about heat sources and/or heat sinks in or near the parking area, weather forecasts concerning temperature, weather forecasts concerning solar irradiation, and weather forecasts concerning wind velocity and/or direction; and wherein the attractiveness data comprise at least one factor selected from the group consisting of: thermal properties of the arriving car, the size and/or appropriateness of the parking spot for the individual car, fuel consumption properties of the car, generation of environmentally detrimental substances by the car, and driving distance of the parking spot from an entrance of the parking area by which the arriving car enters the parking area.

15. The method according to claim 14, further comprising storing measured thermal values associated with the respective parking spots in a database.

16. The method according to claim 15, further comprising:

classifying the respective parking spots of a parking area according to a level of information available in the database about each individual parking spot; and if two parking spots with different levels of information in the database are available for an arriving car, proposing to the arriving car an individual parking spot for which a lower level of information is available.

* * * * *